United States Patent [19]

McLyman

[11] Patent Number: 4,656,412
[45] Date of Patent: Apr. 7, 1987

[54] FERRORESONANT FLUX COUPLED BATTERY CHARGER

[75] Inventor: Colonel W. T. McLyman, Lakewood, Calif.

[73] Assignee: California Institute of Technology, Pasadena, Calif.

[21] Appl. No.: 753,023

[22] Filed: Jul. 8, 1985

[51] Int. Cl.$^4$ .......................... H02J 7/04; G05F 3/06
[52] U.S. Cl. ........................................ 320/39; 320/21; 320/22; 363/75; 323/306; 323/309
[58] Field of Search ................... 363/17, 75; 323/306, 323/309; 320/21, 22, 39

[56] References Cited

U.S. PATENT DOCUMENTS 3,239,750  3/1966  Weber .................................. 323/306
4,525,774  6/1985  Kino et al. ............................. 363/17

OTHER PUBLICATIONS

"Design of a Magnetic Voltage Stabilizer" by Siegfried Lindena, published in the May 1961 issue of Electro-Technology at pp. 154 and 155.
"An Analytic and Computer Study of the Jump Phenomenon in Ferroresonant Regulators" by Ralph Walk, Robert Kakalec and Jacob Rootenberg, published in the Institute of Electrical Electronics Engineers (IEEE) Transactions on Magnetics for Sep. 1971 at pp. 574 to 577.
"A New Feedback-Controlled Ferroresonant Regulator Employing a Unique Magnetic Component" by Harry P. Hart, published in the IEEE Transactions on Magnetics for Sep. 1971 at pp. 571 to 574.
"The Analysis and Design of Constant Voltage Regulators" by I. B. Friedman, published in the Institute of Radio Engineers (IRE) Transactions on Component Parts for Mar. 1956 at pp. 11 to 14.
"The Derivation and Application of Design Equations for Ferroresonant Voltage Regulators and Regulated Rectifiers" by Harry P. Hart and Robert J. Kakalec, published in the IEEE Transactions on Magnetics for Mar. 1971 at pp. 205 to 211.
"The Geometry of Regulating Transformers" by Nathan R. Grossner, published in the IEEE Transactions on Magnetics for Mar. 1978 at pp. 87 to 94.
"Variable Flux-Reset Ferroresonant Voltage Regulator" by Patrick L. Hunter, published in the IEEE Transactions on Magnetics for Sep. 1971 at pp. 564 to 567.

(List continued on next page.)

Primary Examiner—Patrick R. Salce
Assistant Examiner—Mark D. Simpson
Attorney, Agent, or Firm—Jackson & Jones

[57] ABSTRACT

A battery charger for incorporation into an electric-powered vehicle is disclosed. The charger includes a ferroresonant voltage-regulating circuit for providing an output voltage proportional to the frequency of an input AC voltage. A high frequency converter converts a DC voltage supplied, for example, from a rectifier connected to a standard AC outlet, to a controlled frequency AC voltage which is supplied to the input of the ferroresonant circuit. The ferroresonant circuit includes an output, a saturable core transformer connected across the output, and a first linear inductor and a capacitor connected in series across the saturable core transformer and tuned to resonate at the third harmonic of the AC voltage from the high frequency converter. The ferroresonant circuit further includes a second linear inductor connected between the input of the ferroresonant circuit and the saturable core transformer. The output voltage from the ferroresonant circuit is rectified and applied across a pair of output terminals adapted to be connected to the battery to be charged. A feedback circuit compares the voltage across the output terminals with a reference voltage and controls the frequency of the AC voltage produced by the high frequency converter to maintain the voltage across the output terminals at a predetermined value. The second linear inductor provides a highly reactive load in the event of a fault across the output terminals to render the charger short-circuit proof.

17 Claims, 16 Drawing Figures

OTHER PUBLICATIONS

"A New Controlled Constant-Voltage Transformer" by Ronald H. Randall, William R. Archer, and Richard M. Lewis, published in the IEEE Transactions on Magnetics for Sep. 1971 at pp. 567 and 568 (p. 568 is missing).

"The Controlled Ferroresonant Transformer" by L. A. Finzi and Abrahim Lavi, published in the American Institute of Electrical Engineers (AIEE) Transactions for Jan. 1963 at pp. 414 to 419.

"High-Power Ferroresonant Voltage Regulating Transformers" by T. Wroblewski and A. Kusko, reprint of an article believed to be published in the IEEE Transactions for Apr. 1979 at pp. 371 to 375.

"Ferroresonant Transformer" by unknown author, presented at the IEEE Magnetic Society meeting at the California Institute of Technology, Pasadena, California in 1983 or 1984.

FERRORESONANT FLUX COUPLED BATTERY CHARGER

BACKGROUND OF THE INVENTION

1. Origin of the Invention

The invention described herein was made in the performance of work under a NASA Contract and is subject to the provisions of Public Law 96-517 (35 USC 202) in which the contractor has elected not to retain title.

2. Field of the Invention

The present invention relates to battery chargers, and more particularly to battery chargers adapted for incorporation into electric-powered vehicles.

3. Background of the Invention

Electric trucks, wheelchairs and other mobile apparatus which run on batteries require a source of direct current ("DC") for periodically recharging the batteries. Conventional battery chargers for such vehicles are bulky and heavy and therefore cannot be conveniently carried on the vehicle. These and other shortcomings of the prior art battery chargers are overcome by the present invention.

SUMMARY OF THE INVENTION

In accordance with the present invention, a battery charger for mounting directly on a battery-powered vehicle or the like is described. The battery charger includes a first rectifier adapted to be connected to a source of alternating current ("AC") voltage. A high frequency converter circuit is connected to the first rectifier and arranged to convert the DC output voltage from the rectifier into an AC output voltage having a controllable frequency within a predetermined range. The AC output voltage is applied across the input of a voltage-regulating ferroresonant circuit. The ferroresonant circuit includes an output with a nonlinear saturable core transformer and a resonating capacitor connected across the output. The saturable core transformer is arranged to saturate when the AC output voltage from the high frequency converter reaches less than its peak value with the saturation voltage being dependent upon the frequency of the AC output voltage.

To reduce the commutation current through the resonating capacitor of the voltage-regulating ferroresonant circuit and thus the heat generated in the nonlinear transformer, a first linear inductor may be connected in series with the resonating capacitor. The first linear inductor and resonating capacitor are arranged to resonate at the third harmonic of the frequency of the AC output voltage from the high frequency converter. A second linear inductor is connected between the input of the ferroresonant circuit and the saturable core transformer.

A second rectifier is provided with its input connected to the output of the ferroresonant circuit and an output for connection to the battery to be charged. A voltage comparator is coupled either to the ferroresonant circuit or to the second rectifier output for comparing a voltage representative of the output voltage from the second rectifier with a reference voltage and for generating an error signal representative of the difference between said voltages. Feedback means responsive to the error signal are coupled to the high frequency converter for controlling the frequency of the AC output voltage from the converter to reduce the error signal, whereby the voltage supplied to the battery is maintained at a predetermined value. The second linear inductor present a highly reactive load in the event of a fault (short-circuit) across the second rectifier output to render the battery charger short-circuit proof.

Where it is desired to eliminate the need to connect the input of the battery to an AC outlet (e.g., to eliminate arcing, etc.), the charger may be formed in two parts with a separable core transformer providing flux coupling between the ferroresonant circuit and the input to the second rectifier. The use of such a transformer permits one-half of the separable core transformer and the second rectifier to be mounted on a vehicle, while the remaining elements may be stationary. To charge the battery it is only necessary to join the two portions of the transformer core together.

DETAILED DESCRIPTION OF THE DRAWINGS

Figures 1, 2:
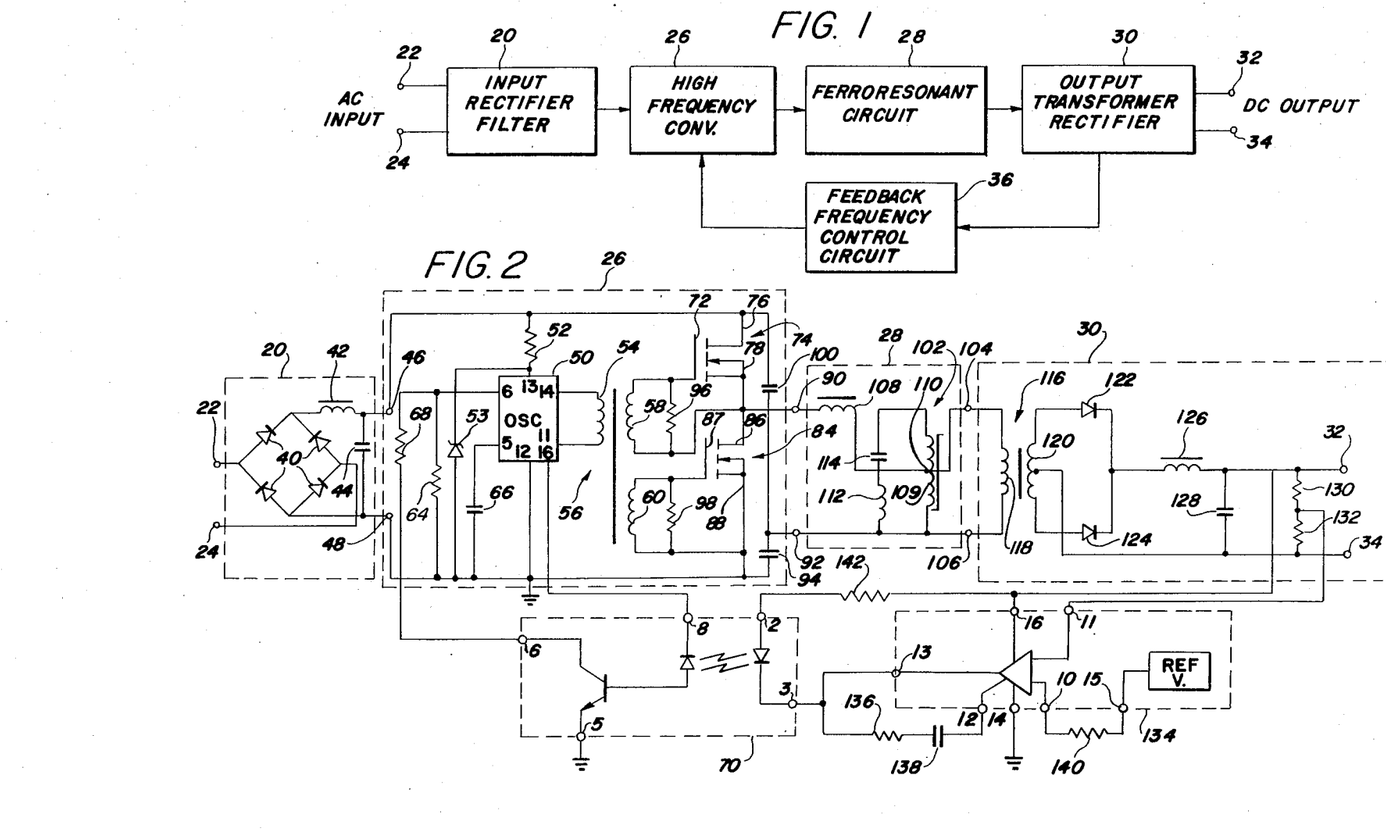
FIG. 1 is a block diagram of a battery charger in accordance with the present invention.
FIG. 2 is a schematic diagram of the battery charge of FIG. 1.

Referring now to the drawings wherein like components are given the same reference numeral, and particularly to FIG. 1, which illustrates in block diagram form a battery charger in accordance with the present invention. The charger includes a rectifier/filter circuit 20 having a pair of input terminals 22 and 24 adapted to be connected to a standard source of AC voltage such as a 110-volt supply. A high frequency converter 26 converts the DC output voltage from the rectifier 20 into an AC output voltage having a controllable frequency within a predetermined range, for example, of the order of 20.0 kilohertz (kHz). The output of the high frequency converter 26 is applied to a ferroresonant circuit 28 which supplies an AC regulated voltage to a transformer/rectifier/filter circuit 30 having output terminals 32 and 34 for connection to the battery to be charged. A frequency control circuit 36 is connected in a feedback loop between the output of the transformer/rectifier/filter circuit 30 and the high frequency converter 26 to control the output frequency from the converter 26 and the amplitude of the output voltage, as will be explained. The use of a high frequency voltage as the input to the ferroresonant circuit reduces the amount of magnetic material needed for the transformers and reduces the weight and bulk of the charger.

Referring now to the schematic diagram of FIG. 2, the rectifier/filter circuit 20 includes four diodes 40 connected in a full wave bridge arrangement to supply DC voltage to the filter consisting of a linear inductor 42 and capacitor 44 connected, as shown, to the input terminals 46 and 48 of the high frequency converter 26.

The high frequency converter 26 includes a controllable high frequency oscillator 50 which may be of the type made by the Silicon General Corporation ("SC") under Part No. 1525. Terminal 13 of this oscillator is connected to the positive input terminal 46 through a resistor 52. A zener diode 53 is connected between the terminal 13 and ground to limit the supply voltage to the oscillator 50. The terminal 12 of the oscillator 50 is connected to ground, as illustrated, and terminals 11 and 14 are connected across a primary winding 54 of a transformer 56. The transformer 56 includes secondary windings 58 and 60 connected to operate a pair of field effect transistors ("FET"), as will be described. A resistor 64 is connected between terminal 6 and ground and a capacitor 66 is connected between terminal 5 of the oscillator and ground. The resistor 64 and capacitor 66 determine the lowest operating frequency at which the oscillator will operate. Were the values of the resistor 64 and capacitor 66 are 8.25 kΩ+0.0047 μf, respectively, the lowest operating frequency of the oscillator 50 will be 20 kHz. An additional resistor 68 (having a value, for example, of 15 kΩ) is connected between the terminal 6 of the oscillator 50 and the output of an optocoupler 70 which forms part of the frequency control circuit 36, as will be described.

The secondary windings of the transformer 56 are coupled to the gate electrodes 87 of a pair of FETs 74 and 84. The FET 74 includes a drain electrode 76 connected to the input terminal 46 and a source electrode 78 connected to an output terminal 90 of the high frequency converter. Another output terminal 92 of the converter is connected through a capacitor 94 to ground, as shown. The FET 84 includes a drain electrode 86 connected to the terminal 90 and a source electrode 88. A pair of resistors 96 and 98 are connected across secondary windings 58 and 60 of the transformer 56, as shown. An additional capacitor 100 is connected between the terminals 92.

The high frequency converter converts the DC voltage from the rectifier into a high frequency (e.g., 20 kHz) voltage with the frequency being dependent upon the resistance between pin 6 of the oscillator 50 and ground. As this resistance decreases, the oscillator frequency increases and vice versa.

The output of the high frequency converter is applied to the input (terminals 90, 92) of the ferroresonant circuit 28. A nonlinear saturable core transformer 102 is connected across the output of the ferroresonant circuit, i.e., terminals 104 and 106. A linear inductor 108 is connected in series between the terminal 90 and terminal 110 (i.e., center tap) of the transformer 102. A second linear inductor 112 and a resonating capacitor 114 are connected in series across the transformer 102, as shown.

The transformer 102 is designed to saturate at a voltage about 5% below the peak value of the AC output voltage from the high frequency converter 26 when the frequency of the output is at its lowest value, e.g., 20 kHz.

Figure 3:
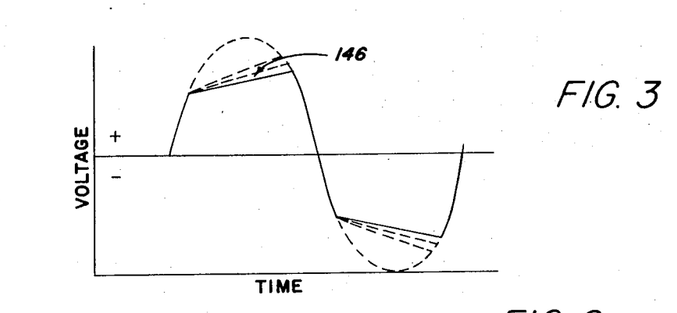
FIG. 3 is a waveform illustrating the relationship between the amplitude of the output voltage from the ferroresonant circuit of FIG. 1 and the frequency of the AC input voltage thereto.

The values of the capacitance for capacitor 114 and the inductance for inductor 108 and transformer 102 are chosen to provide resonance at the nominal frequency of the oscillator 50, e.g., 20 kHz. At resonance, the voltage across the capacitor 114 reaches its maximum and saturates the transformer 102. When the transformer core saturates, the transformer operates in the constant volt/second area of the characteristic curve, i.e., supply voltage versus time, as is shown in FIG. 3. In that region the flux lines cannot increase to support a higher voltage. As a result, the output voltage of the ferroresonant circuit 28 is hard limited to a selected value so that the voltage supplied to the battery is very close to the optimum. A precise value for the voltage supplied to the battery is achieved by a feedback circuit including the frequency control circuit 36, as will be explained.

To limit the current through the transformer 102 (at high frequencies, e.g., 20 kHz) and prevent overheating, the inductor 112 is connected in series with the capacitor 114. The inductance value of the inductor 112 is chosen to cause the inductor 112 and the capacitor 114 to resonate at the third harmonic of the oscillator (50) frequency.

The values of inductors 108 and 112 and capacitor 114 may be obtained from the following formulas:

$$L_{108} = \frac{R_p}{2\omega}$$

$$C_{114} = \frac{1}{.33\omega R_p}$$

$$L_{112} = \frac{1}{4\pi^2 f^2 C_{114}}$$

where:
$R_p$ = the load resistance reflected back to the output of the ferroresonant circuit 28.
$\omega = 2\pi f$
f = frequency of the oscillator 50.

The regulated output voltage from the ferroresonant circuit 28 is applied to the transformer/rectifier/filter circuit 30. This circuit comprises a transformer 116 having a primary winding 118 connected to the output terminals 104 and 106, as was discussed, and a secondary winding 120 which supplies an AC voltage to a pair of diodes 122 and 124 connected in the half bridge arrangement, as shown. The junction of the diodes 122 and 124 is connected to a linear inductor 126 which serves with a capacitor 128 as a filter for removing the ripple from the rectified voltage and providing a regulated DC output voltage across terminals 32 and 34 for charging the battery.

A feedback signal for the frequency control circuit is obtained across one of a pair of bridging resistors 130 and 132 connected across the output terminals 32 and 34 with the feedback signal applied between pins 11 and 14 of a comparator 134, which may be of the type manufactured by the Silicon General Corporation under Part No. 1543. Pin 16 of the comparator 134 is connected to the positive output terminal 32, and the output of the comparator 134 on pin 13 is applied to pin 3 of the optocoupler 70. The comparator forms the second part of the frequency control circuit 36 (see FIG. 1).

A phase shift network comprising a resistor 136 and a capacitor 138 is connected between pin 13 and pin 12 of the comparator to provide stability. Another resistor 140 is connected between pins 10 and 15 of the comparator 134. The comparator 134 includes a reference voltage source of 2.5 volts. A resistor 142 is connected between the positive output terminal of the battery charger 32 and pin 2 of the optocoupler 70 to provide a source of current for a light-emitting diode which is internal to the optocoupler. Pin 16 of the oscillator 50 is connected to pin 8 of the optocoupler 80 for providing a 5-volt reference voltage to drive a light-sensitive diode, which in turn provides bias for an internal semiconductor illustrated as a transistor. Pin 5 of the optocoupler is connected to ground, as shown.

The output voltage of the battery charger may be set at any desired value such as 12 volts, 28 volts, 6 volts, etc. The resistors 130 and 132 are selected so that the comparator output (or an error signal) will be zero when the desired output voltage on terminals 32 and 34 is present.

Referring now to FIG. 3, there is illustrated in solid lines the waveform of the output voltage across the saturable core transformer 102. This output voltage approximates a square wave. The slanted dashed line 146 illustrates the manner in which the amplitude of voltage across the saturable transformer varies with the input voltage from the high frequency converter. The amplitude of output voltage from the ferroresonant circuit increases as the frequency increases and vice versa. The output voltage from the charger is regulated by controlling this frequency.

In operation, the voltage (across resistor 130) representative of the output voltage is compared with the reference voltage in the comparator 134. If the output voltage changes (e.g., due to a change in the load impedance, input voltages, etc.), an error signal is produced at the output of the comparator 134 and supplied to the optocoupler 70. This error signal increases or decreases the impedance of the semiconductor in the optocoupler 70, thereby increasing or decreasing the resistance in parallel with the resistor 64 and decreasing or increasing the frequency of the oscillator 50. The lower frequency of the AC output voltage from the high frequency converter results in a lower saturation voltage for the saturable core transformer 102. The amplitude of the output voltage across terminals 32 and 34 is thus decreased until the error signal goes to zero. The charger is inherently short circuit proof since the series inductor 108 presents a highly reactive load in this condition.

The waveforms of the voltages and currents present at several points in the ferroresonant circuit 28 with and without the inductor 112 connected in the circuit are illustrated in FIGS. 4A–4E. With inductor 112 removed from the circuit, one terminal of the capacitor 114 is simply connected to ground.

Figure 4A:
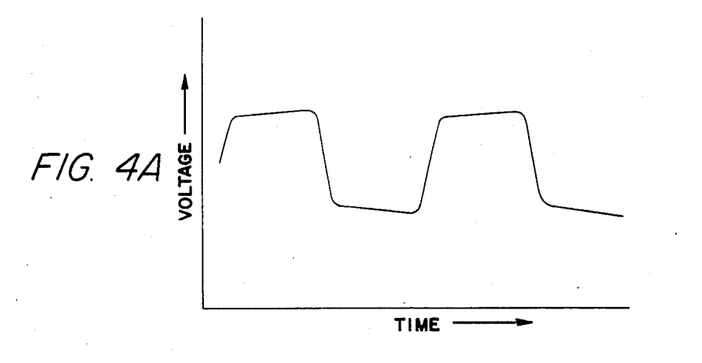
FIG. 4A is a waveform diagram showing the output voltage from a conventional ferroresonant circuit used as a voltage regulator.
Figure 4B:
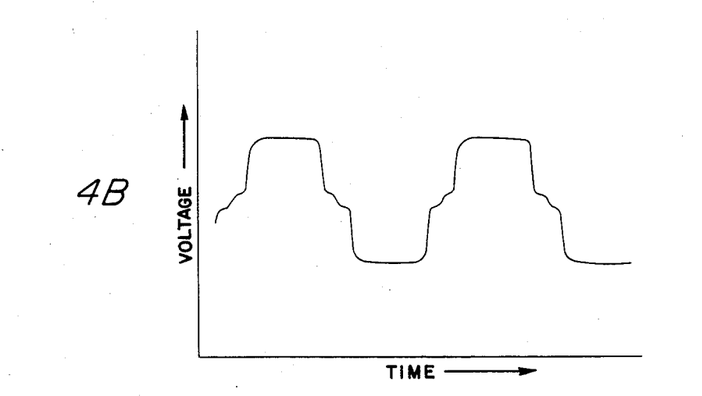
FIG. 4B is a waveform diagram of the output voltage from the ferroresonant circuit of FIG. 2.

FIGS. 4B and 4A illustrate the waveform of the voltage across the output (points 104, 106) of the ferroresonant circuit of FIG. 1 and with and without inductor 112, respectively.

Figure 4C:
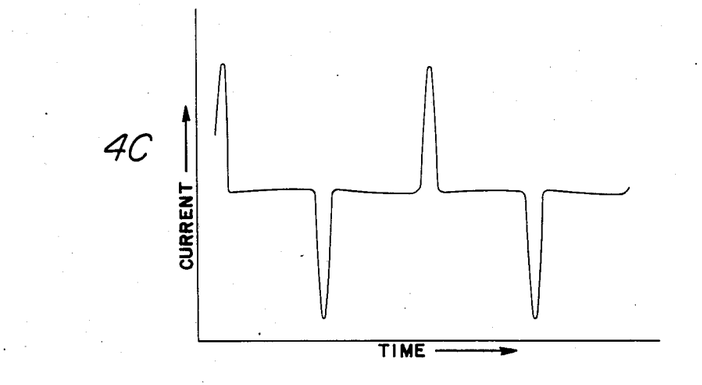
FIG. 4C is a waveform diagram of the current through the resonating capacitor of a conventional ferroresonant circuit.
Figure 4D:
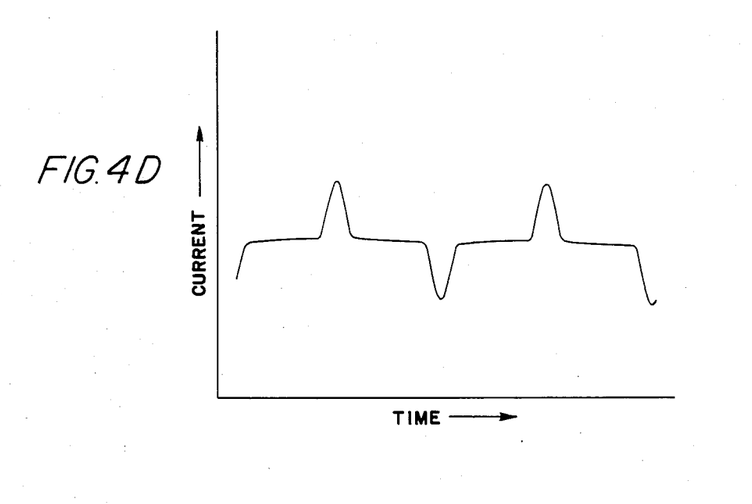
FIG. 4D is a waveform diagram of the current through the resonating capacitor of the ferroresonant circuit of FIG. 2.
Figure 4E:
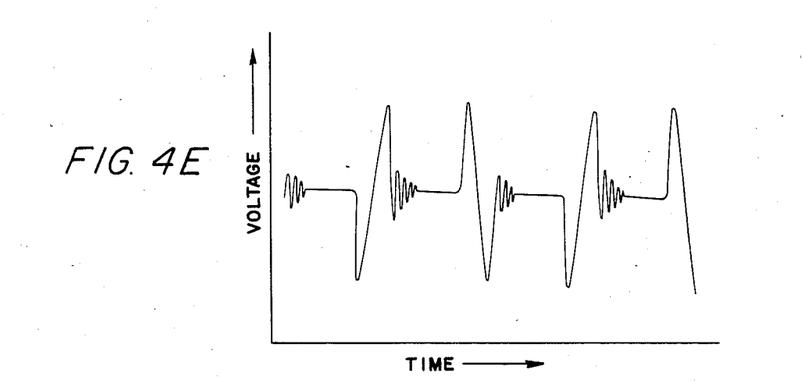
FIG. 4E is a waveform diagram of the voltage across the inductor that is in series with the capacitor of the circuit of FIG. 2.

FIGS. 4D and 4C represent the current flow through the resonating capacitor 114 with and without the inductor 112 connected in the circuit, respectively. FIG. 4E represents the voltage across the inductor 112.

Each time the voltage across the resonating capacitor 114 changes state there is a high current peak, the amplitude of which is limited only by the equivalent series resistance of the capacitor and the impedance of any circuit element connected in series with the capacitor. At a high operating frequency, e.g., 20 kHz, the capacitor commutating current has a high-duty ratio. As a result, the current (rms) in conventional ferroresonant circuits (without inductor 112) is very high when operating at such high frequencies (as contrasted with 60 or 400 Hz). This high current will lead to excessive heating of the core and winding of the saturable core transformer. The addition of the inductor 112 reduces the current by forcing the capacitor 114 to charge at the resonant frequency of the $L_{112}$ and $C_{114}$. This frequency is chosen as the third harmonic of the frequency of the oscillator 50. See FIGS. 4C and 4D. The inductor 112 in series with the resonating capacitor 114 also improves the stability of the ferroresonant circuit.

Figure 5:
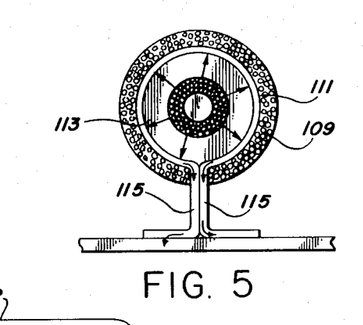
FIG. 5 is a cross-sectional view of a saturable core transformer, including a heat-dissipating bracket disposed between the core and winding which may be used in the circuit of FIG. 1.

An improvement in the design of a saturable core transformer is shown in FIG. 5 in which a heat transfer bracket 111 is contoured around a toroidal core 113 with the winding 109' wound around both the core and the bracket. The bracket includes "L"-shaped foot portions 115 which may be thermally connected to a metal chassis. The bracket 111 may be made of a suitable nonmagnetic material with good heat conduction properties. The bracket 111 extracts the heat not only away from the transformer core, but also from the winding 109'. The reduction in heat within the transformer core improves performance and reliability.

Figure 6:
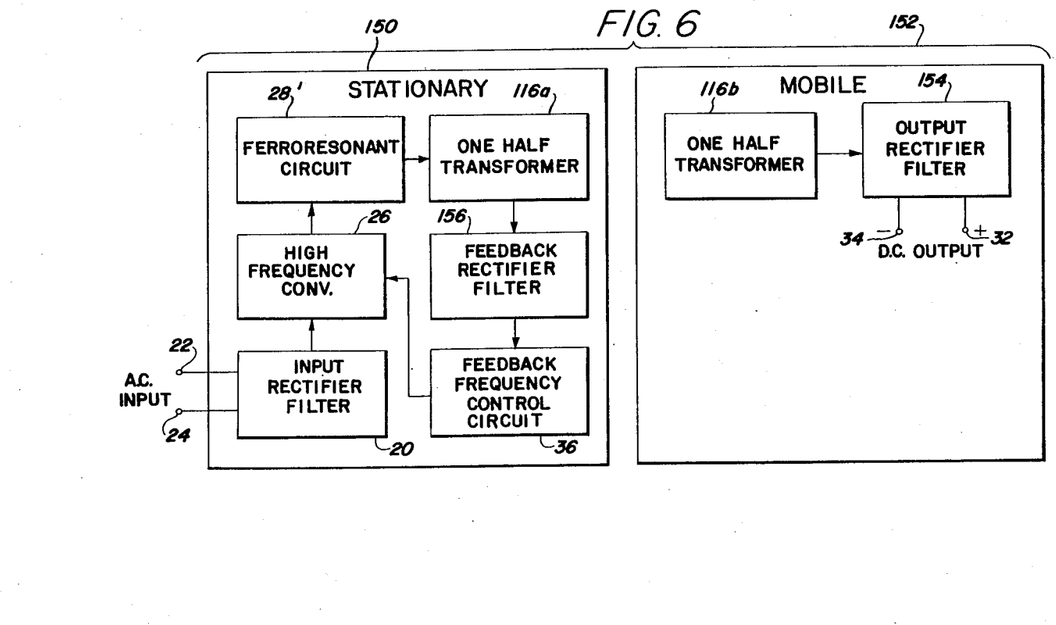
FIG. 6 is a block diagram of another embodiment of the present invention in which a portion of the power supply is adapted to remain stationary while another portion is adapted to be carried by the vehicle; p

Referring now to FIG. 6, there is illustrated another embodiment of the present invention in which a portion of the battery charger 150 is designated as stationary and another portion 152 is designated as mobile. The stationary portion of the battery charger includes the ferroresonant circuit 28', the high frequency converter 26 and the input rectifier filter 20. The output from the ferroresonant circuit 28' is fed to one-half of a separable core transformer designated by the numeral 116a. The other half of the transformer is designated 116b and is carried by the mobile unit, such as a wheelchair, electric truck, etc. The output of the half-transformer 116b is supplied to an output rectifier filter 154, which in turn supplies charging voltage (and current) to the terminals 32 and 34. A feedback signal rectifier/filter 156 is connected to the half-transformer 116a to supply a feedback voltage representing the output voltage (across terminals 32, 34) to the frequency control circuit 36.

Figure 7:
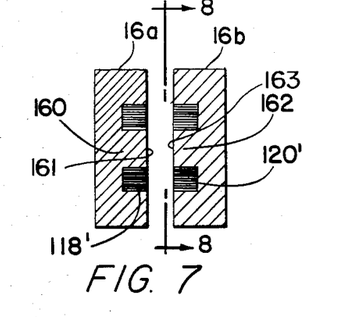
FIG. 7 is a cross-sectional view of a separable core transformer which may be used in the circuit of FIG. 6.
Figure 8:
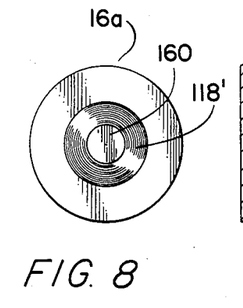
FIG. 8 is a plan view of the transformer of FIG. 7 taken along line 8—8.

Referring now to FIGS. 7 and 8, the separable core transformer may include a pair of pot cores 160 and 162 (having an E-shaped cross-section), with the primary winding 118' which may be in the form of a ribbon or foil wound around an inner post 161 on the core 160 and the secondary winding 120' wound around an inner post 163 of the core 162.

Figures 9, 10:
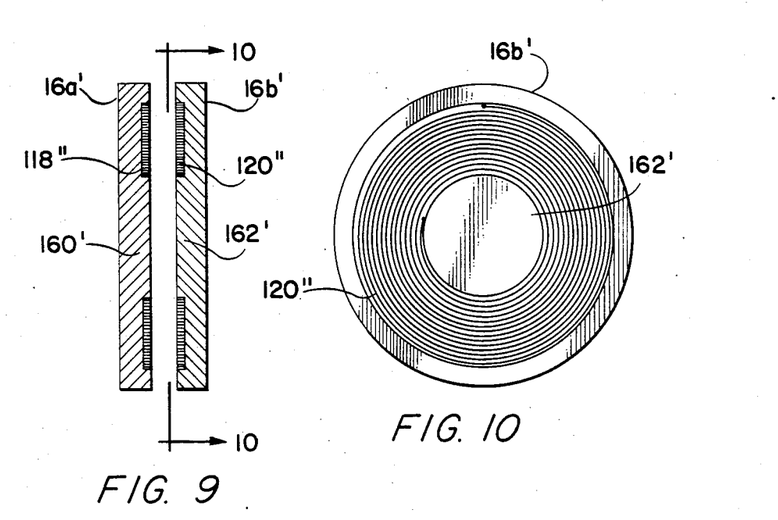
FIG. 9 is a cross-sectional view of another embodiment of a separable core transformer which may be used in the circuit of FIG. 6.
FIG. 10 is a view of the transformer of FIG. 9 taken along line 10—10.

An alternative separable core transformer for reducing leaking inductance is illustrated in FIGS. 9 and 10, in which the cores 160' and 162' contain flat spiral windings 118" and 120" in the form of printed circuits.

Figure 11:
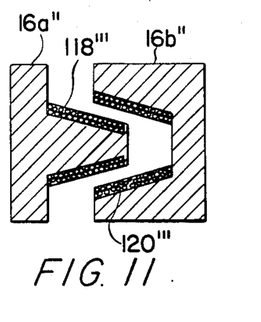
FIG. 11 is a cross-sectional view of an additional embodiment of a separable core transformer which may be used in the circuit of FIG. 5.

FIG. 11 illustrates another separable core transformer having a male portion 116a" and a female portion 116b" with the primary winding 118'" on the portion 116a" and the secondary winding 120'" wound on the inside of the portion 16b". This configuration permits self-alignment of the two core halves.

The use of separable core transformers such as those shown in FIGS. 7 through 11 eliminates the need for a wall plug connection with its attendant risk of creating sparks, shocks, etc. When the transformer halves are joined, the flux is coupled from the primary to the secondary winding to provide charging current at the output terminals 32 and 34 (FIG. 6) via the output rectifier/filter 154. When the mobile half of the charger is disconnected (e.g., transformer halves separated), the flux path is interrupted and the voltage in the ferroresonant circuit collapses to zero because of the low impedance of the primary winding 118', 118" or 118'". The current (reactive), however, is limited by the series inductor 108. Since the load is almost entirely inductive, very little power is dissipated in the stationary portion 150 (FIG. 6) with the input terminals permanently connected to the AC source.

Figure 12:
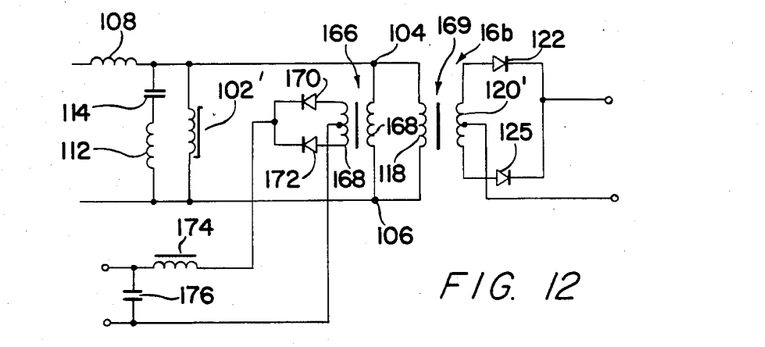
FIG. 12 is a schematic diagram of the frequency control circuit for use in the circuit of FIG. 5.

Referring now to FIG. 12, there is illustrated the ferroresonant circuit 28', transformer 116a/116b and the feedback/rectifier/filter circuit 56 for the embodiment of FIG. 6. The ferroresonant circuit 28' includes a nonlinear saturable core transformer 102' with a single winding connected in parallel with the first linear inductor 114 and the resonating capacitor 112 across the output. The feedback/rectifier/filter circuit 156 comprises a signal transformer 166, including a primary winding 168 connected across the output terminals 104 and 106 of the ferroresonant circuit and a secondary winding 168 connected to a half-bridge rectifier arrangement in the form of a pair of rectifiers 170 and 172. A filter comprising an inductor 174 and a capacitor 176 is connected, as shown, between the cathodes of the diodes 170, 172 and the center tap of the transformer 168. The output voltage across capacitor 176 represents the output voltage across the charger terminals 32 and 34 with some coupling losses, etc. This voltage is applied to the feedback frequency control circuit or across pins 11 and 14 of the comparator 134 to control the frequency of the oscillator 50 and the amplitude of the output voltage across terminals 32 and 34, as discussed previously.

There has been described an improved battery charger particularly adapted for use on electric-powered vehicles which are small, lightweight, efficient and short circuit proof. Various modifications to the embodiments illustrated will be apparent to those skilled in the art without involving any departure from the spirit or scope of the invention.

What is claimed is:

1. A ferroresonant voltage-regulating circuit having a pair of input terminals and a pair of output terminals for use in a battery charger or the like comprising:
   (a) a nonlinear saturable core transformer connected across the output terminals;
   (b) a first linear inductor and a resonating capacitor connected in series across the nonlinear transformer; and
   (c) a second linear inductor connected between one of the input terminals and the nonlinear transformer, the second linear inductor, resonating capacitor and nonlinear transformer being arranged to resonate at a predetermined frequency in excess of 400 Hz, the first inductor and resonating capacitor being arranged to resonate at the third harmonic of the predetermined frequency, the second linear inductor being further arranged to present a highly reactive load across the input terminals in the event of a fault across the output terminals to render the circuit short-circuit proof.

2. The ferroresonant voltage-regulating circuit of claim 1 wherein the nonlinear transformer is an autotransformer having a centertap and two end terminals, the centertap and one end terminal being connected across the output of the ferroresonant circuit.

3. The ferroresonant voltage-regulating circuit of claim 2 wherein the resonating capacitor and first linear inductor are connected across the two end terminals of the nonlinear transformer and the predetermined frequency is about 20 kHz.

4. The ferroresonant voltage-regulating circuit of claim 1 wherein the nonlinear transformer has a single winding, the single winding being connected across the output of the ferroresonant circuit.

5. The ferroresonant voltage-regulating circuit of claim 1 wherein the saturable core transformer includes a toroidal core, a winding and a heat-dissipating bracket, the heat-dissipating bracket including a portion in contact with the outer periphery of the core, the winding surrounding the core and at least the portion of the bracket which surrounds the core.

6. The ferroresonant voltage-regulating circuit of claim 5 wherein the heat-dissipating bracket includes a foot portion extending from the core and arranged to be secured to a heat sink.

7. In a circuit for providing charging current to a battery or the like from an AC source, the combination which comprises:
   (a) first rectifier means adapted to be connected to the AC source for providing a DC output voltage;
   (b) high-frequency converter means having an input connected to the first rectifier means, and an output, the high-frequency converter means being arranged to convert the DC output voltage from the first rectifier means into an AC output voltage having a frequency within a predetermined range;
   (c) ferroresonant means having an input connected to the output of the high frequency converter means, and an output, the ferroresonant means including a non-linear saturable core transformer connected across the output thereof, a resonating capacitor and a first linear inductor connected in series across the saturable core transformer and a second linear inductor connected in series between the input of the ferroresonant means and the saturable core transformer, the saturable core transformer being arranged to saturate when the output voltage from the high frequency converter means reches less than its peak value, the voltage level at which saturation takes place being dependent upon the frequency of the output voltage from the high-frequency converter means, the values of the resonating capacitor, the second linear inductor and the saturable core transformer being chosen to provide resonance at the frequency of the AC output voltage from the high-frequency converter means, the value of the first inductor being chosen to cause the resonating capacitor and first inductor to resonate at the third harmonic of the output voltage from the high-frequency converter means;

(d) second rectifier means having an input connected to the output of the ferroresonant means, and an output for providing charging current, the second linear inductor being arranged to present a highly reactive load across the output of the high-frequency converter means in the event of a short across the output of the second rectifier means to render the charging circuit short-circuit proof;

(e) means coupled to one of said ferroresonant means and second rectifier means for comparing a voltage representative of the output voltage from the second rectifier means with a predetermined value and for generating an error signal representative of the difference in the values; and (f) means responsive to the error signal and coupled to the high frequency converter means for controlling the frequency of the AC output voltage from the high-frequency converter means to reduce the error signal.

8. The battery-charging circuit of claim 7 wherein the nonlinear transformer is an autotransformer having a centertap and two end terminals, the centertap and one end terminal being connected across the output of the ferroresonant circuit.

9. The battery-charging circuit of claim 8 wherein the resonating capacitor and first linear inductor are connected across the two end terminals of the nonlinear transformer.

10. The battery-charging circuit of claim 7 wherein the nonlinear transformer has a single winding, the single winding being connected across the output of the ferroresonant circuit.

11. In a circuit for providing charging current to a battery or the like from an AC source, the combination which comprises:

(a) first rectifier means adapted to be connected to the AC source for providing a DC output voltage;

(b) high-frequency converter means having an input connected to the first rectifier means, and an output, the high-frequency converter means being arranged to convert the DC output voltage from the first rectifier means into an AC output voltage having a frequency within a predetermined range;

(c) ferroresonant means having an input connected to the output of the high frequency converter means, and an output, the ferroresonant means including a non-linear saturable core transformer connected across the output thereof, the saturable core transformer being arranged to saturate when the output voltage from the high frequency converter means reaches less than its peak value, the voltage level at which saturation takes place being dependent upon the frequency of the output voltage from the high-frequency converter means;

(d) second rectifier means having an input, and an output providing charging current;

(e) a linear transformer connected between the output of the ferroresonant circuit and the input of the second rectifier means, the linear transformer having a pair of separable mating core sections with a primary winding wound on one core section and a secondary winding wound on the other core section so that energy is coupled from the primary winding to the secondary winding only when the core sections are placed adjacent each other;

(f) means coupled to one of said ferroresonant means and second rectifier means for comparing a voltage representative of the output voltage from the second rectifier means with a predetermined value and for generating an error signal representative of the difference in the values; and (g) means responsive to the error signal and coupled to the high frequency converter means for controlling the frequency of the output voltage from the high-frequency converter means to reduce the error signal.

12. The battery-charging circuit of claim 11 wherein each core section of the linear transformer is one-half of a pot core configuration having an E-shaped cross-section with a cylindrical central portion and an annular outer portion joining a cylindrical base portion.

13. The battery-charging circuit of claim 12 wherein each of the windings is in the form of a ribbon.

14. The battery-charging circuit of claim 12, wherein each of the windings is in the form of a spirally-formed printed circuit.

15. The battery-charging circuit of claim 11 wherein one core section comprises a cylindrical base portion and a centrally-located frustoconical portion protruding outwardly from the base portion, and the other core section comprises a cylindrical base portion and an annular portion protruding from the base, the annular portion having an internal taper matching the taper of the frustoconical portion.

16. In a circuit for providing charging current to a battery or the like from an AC source, the combination which comprises:

(a) first rectifier means adapted to be connected to the AC source for providing a DC output voltage;

(b) high-frequency converter means having an input connected to the first rectifier means, and an output, the high-frequency converter means being arranged to convert the DC output voltage from the first rectifer means into an AC output voltage having a frequency witin a predetermined range;

(c) ferroresonant means having an input connected to the output of the high frequency converter means, and an output, the ferroresonant means including a non-linear saturable core transformer connected across the output thereof, the saturable core transformer having a toroidal core and a winding and being arranged to saturate when the output voltage from the high frequency converter means reaches less than its peak value, the voltage level at which saturation takes place being dependent upon the frequency of the output voltage from the high-frequency converter means;

(d) a heat-dissipating bracket having a portion thereof in contact with the outer periphery of the toroidal core and the winding of the saturable core transformer for transferring heat away from the core and winding;

(e) second rectifier means having an input connected to the output of the ferroresonant means, and an output for providing charging current;

(f) means coupled to one of said ferroresonant means and second rectifier means for comparing a voltage representative of the output voltage from the second rectifier means with a predetermined value and for generating an error signal representative of the difference in the values; and (g) means responsive to the error signal and coupled to the high frequency converter means for controlling the frequency of the output voltage from the high-frequency converter means to reduce the error signal.

17. The battery-charging circuit of claim 16 including a heat sink and wherein the heat-dissipating bracket surrounds the toroidal core and includes a foot portion extending from the core and arranged to be secured to the heat sink.

* * * * *